United States Patent [19]

Ehara

[11] Patent Number: 5,585,887
[45] Date of Patent: Dec. 17, 1996

[54] METHOD OF DETECTING A FILM WITH OPTICAL DETECTING MEANS IN PHOTOGRAPHIC PROCESSOR

[75] Inventor: Takuji Ehara, Wakayama, Japan

[73] Assignee: Noritsu Koki Co., Ltd., Wakayama, Japan

[21] Appl. No.: 386,759

[22] Filed: Feb. 10, 1995

[30] Foreign Application Priority Data

Feb. 10, 1994 [JP] Japan .................................. 6-016404

[51] Int. Cl.[6] .......................... G03D 15/00; G03B 27/52; G01N 21/00
[52] U.S. Cl. .......................................... 355/41; 250/559.1
[58] Field of Search ................................ 355/38, 40, 41, 355/68; 250/559.1; 356/443, 444

[56] References Cited

U.S. PATENT DOCUMENTS 4,978,858  12/1990  Ellsworth et al. ................... 250/559.1
5,260,740  11/1993  Seto ........................................ 355/41

FOREIGN PATENT DOCUMENTS 4-350645  12/1992  Japan ........................................ 355/41

*Primary Examiner*—Joan H. Pendegrass
*Attorney, Agent, or Firm*—Wenderoth, Lind & Ponack

[57] ABSTRACT

A method of detecting a film with an optical detector in a photographic printer machine detects the presence of a film with the optical detector installed at a film detecting location where a light receiver receives an intensity of light from a light emitter. The method includes the steps of determining a setting of the film detector so that outputs of the light receiver are higher than a reference level prepared in a controller for judging the presence of the film and assigning the setting to the film detector so that the outputs of the light receiver have a sufficient margin as compared with the reference level. The initial setting for detecting the presence of a photographic film is thereby carried out without using any reference film.

5 Claims, 9 Drawing Sheets

METHOD OF DETECTING A FILM WITH OPTICAL DETECTING MEANS IN PHOTOGRAPHIC PROCESSOR

BACKGROUND OF THE INVENTION

The present invention relates to a method of detecting a film with an optical detector in a photographic processing machine.

A photographic processing machine, e.g. a photographic printer, is provided with an optical film detector which, upon detecting the loading of a film, produces and delivers a detection signal to other automatic devices for actuation.

The film detector is preset to an appropriate detection condition level by an initial setting of reference data using a developed film. The initial setting is made to between two extreme levels which represent the presence and absence of the film. In common, the initial setting is carried out at the factory before shipment and/or at the site by a service person during maintenance service.

Such a conventional film detecting method is thus essential to conduct the initial setting using a reference film. If the film detector comprises a plurality of components, the initial setting will be troublesome because the components have to be adjusted one by one.

Also, a reference film with an average density should be employed. If a high density film is used for the initial setting, the detection of a low density film is hardly feasible. The photographic printer machine may thus produce frequent faulty operations or troubles.

The initial setting also tends to deteriorate with time and becomes incorrect, for example, when the film detector gets dirty.

It is an object of the present invention, for eliminating the foregoing disadvantages of the conventional film detecting method, to provide an improved film detecting method in which the initial setting is carried out without using a reference film so that no troublesome adjustment on each component is needed and faulty operations of the film detector are avoided.

SUMMARY OF THE INVENTION

For solving the above disadvantages, a method of detecting a film with an optical detector in a photographic printer machine, according to the present invention, is provided for detecting the presence of a film with the optical detector installed at a film detecting location where light receiver means receive an intensity of light from a light emitter, which comprises determining a setting of the film detector means so that outputs of the light receiver are higher than a reference level prepared in a controller for judgment of the presence of the film, and assigning the setting to the film detector so that the outputs of the light receiver have a sufficient margin as compared with the reference level. As the result, the initial setting for detecting the presence of a photographic film is carried out without using any reference film.

The margin is determined depending on the sensitivity characteristics of the film detector.

With respect to the foregoing method, the light receiver may be provided with an output circuit which contains a reference level modifier the reference level is increased by the margin to have a modified reference level. The illumination of the light emitter is then increased until the reference level of the reference level modifier reaches the modified reference level. After the light emitter is preset with the modified reference level, the reference level modifier is shifted back to the original reference level. As the result, the light emitter has a margin of illumination corresponding to the sufficient margin over the reference level.

In another modification of the method, the controller is programmed to increase the illumination of the light emitter so that the margin covers an instantaneous excessive intensity of light over the reference level.

Also, the controller means may be programmed to increase the gain of the light receiver so that the margin covers an instantaneous excessive gain over the reference level.

It may be adapted to read each output of the light receiver in relation to a corresponding intensity of light of the light emitter and reduce the output to a given level which is then stored and used as the reference level.

DETAILED DESCRIPTION OF THE PREFERRED EMBODIMENTS

Preferred embodiments of the present invention will be described referring to the accompanying drawings.

Embodiment 1

Figure 1:
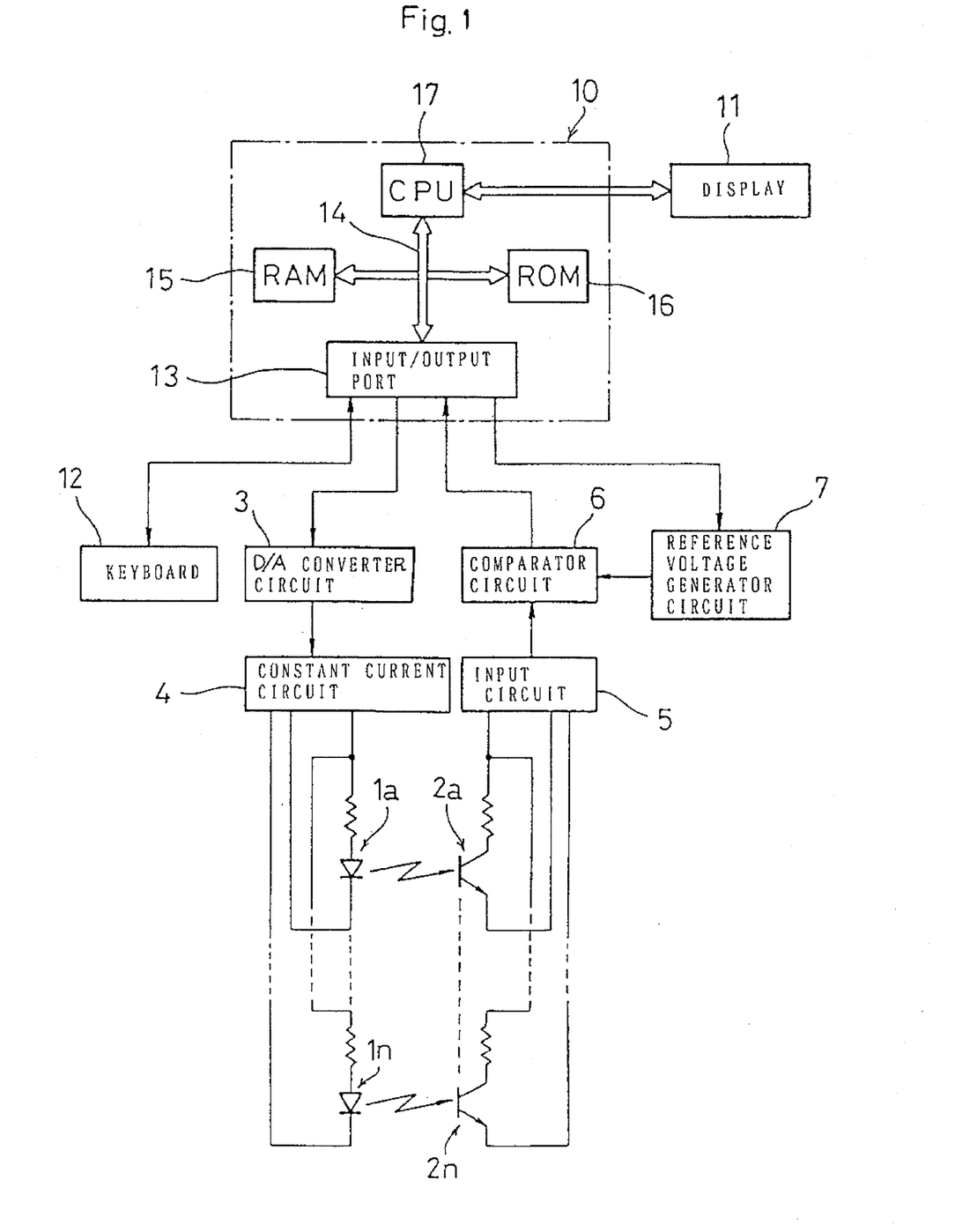
FIG. 1 is a schematic overall block diagram of a control circuit showing a first embodiment of the present invention.

FIG. 1 is a schematic block diagram of a circuit for controlling an optical film detector in a photographic printer machine showing one embodiment of the present invention. An electronic control circuit 10 is connected to a display 11 and a keyboard 12. The display 11 is provided for displaying screen messages indicative of detected information from a film detector. The keyboard 12 is manually operable for modifying the detected information on the display.

The electronic control circuit 10 has various functions for actuating a film feeder, guides, a scanner, an exposure illumination source, optical filters, and other devices which are not all shown. The electronic control circuit 10 also contains a control program for the film detector.

In common, the operation and setting of the optical film detector are controlled by a timer (not shown) which has been preset for start or interval actions of the photographic printer machine using the electronic control circuit 10. It would be understood that the film detector can also be controlled by manual entry of commands through the keyboard 12.

There are provided an input/output port 13, a bus circuit 14, a RAM (random access memory) 15, a ROM (read only memory) 16, and a CPU (central processing unit) 17.

The optical film detector comprises multiple pairs of light emitters 1a and light receivers 1b: for example, light emitting diodes and pin-PD photodiodes respectively, which are mounted at appropriate locations in the photographic printer machine. Each pair of diodes of the film detector are denoted by 1n and 2n in FIG. 1.

The light emitters 1a to in are actuated by an analog control signal which is converted by a D/A converter circuit 3 from a digital output of the electronic control circuit 10 and fed via a constant current circuit 4.

The light receivers 2a to 2n deliver their respective detection signals to an input circuit 5 where they are processed before furthers being transmitted to the electronic control circuit 10. The output of the input circuit 5 is fed en route to a comparator circuit 6 where it is compared in magnitude with a reference voltage supplied from a reference voltage generator circuit 7 to produce comparison signals H and L (high and low) which are then transmitted to the electronic control circuit 10. The reference voltage of the reference voltage generator circuit 7 is produced in response to a corresponding signal from the electronic control circuit 10.

The method of film detection with the optical film detector according to the present invention is implemented by the foregoing control circuit.

Figure 2:
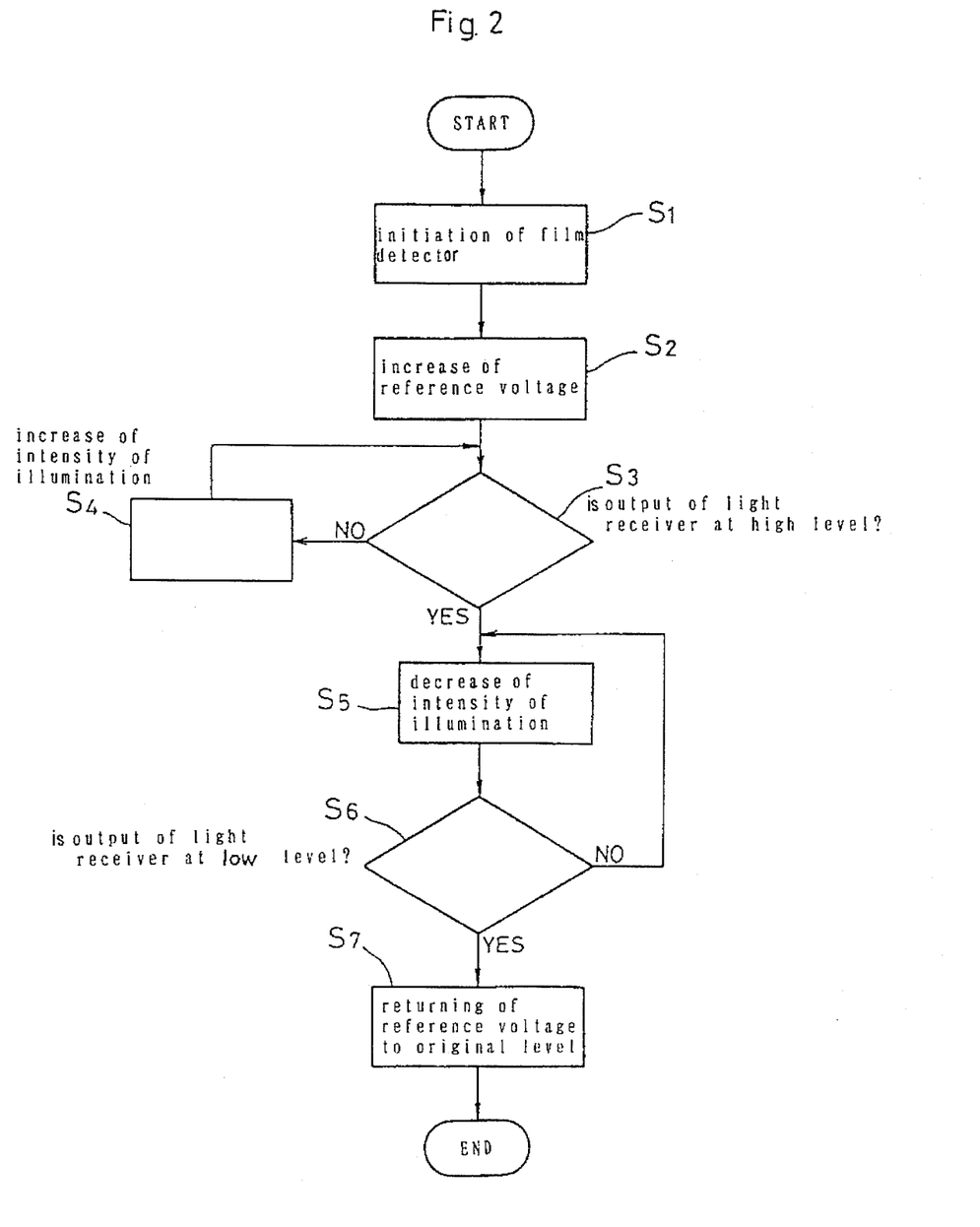
FIG. 2 is a flowchart explaining a method of detecting a film implement, with the control circuit.

In a manual mode, the flowchart shown in FIG. 2 is commenced by key entry action with the keyboard 12. An automatic mode action starts when a start-up inspection mode of the photographic printer machine is selected and accessed. The action of the flowchart starts with Step S1 where the film detector is initiated so that each light path between the light emitter 1 and the light receiver 2 is not blocked. This initial action may be executed by an unshown transfer mechanism. If a film is in its loaded position, it may be moved back to clear the light path.

At Step S2, the electronic control circuit 10 sends a command signal to the reference voltage generator circuit 7 for temporary increase of the reference voltage. The increase may substantially be equal to, but not limited to, 20% of the reference voltage. It is determined depending on sensitivity characteristics of the film detector so that the intensity of transmitted light is decreased to 50% to 60% when blocked by a film. This may be common to other embodiments employing 20% or 80%.

Figure 3A:
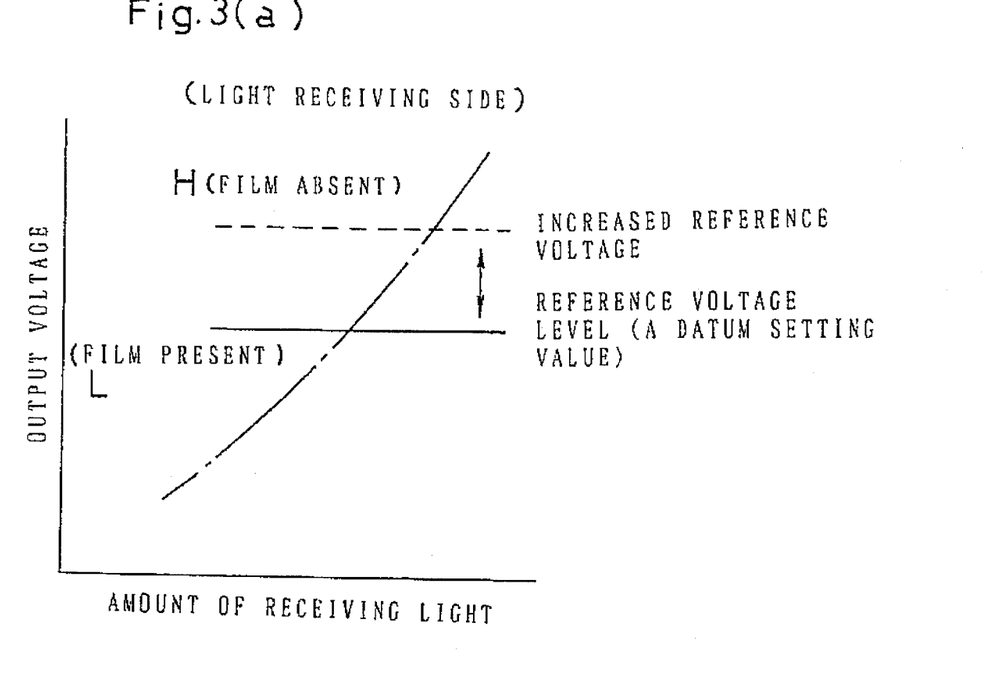
FIGS. 3(a) and 3(b) are explanatory views showing conditions of the first to fourth embodiments of the present invention.

A determinations is then made at Step S3 as to whether or not the output of the light receiver 2 is at a high level. If not, the intensity of illumination of the light emitter 1 is increased at Step S4 until the output of the light receiver 2 shifts from low to high. The high and low outputs or H and L signals are indicative of above and below a reference voltage level (a datum setting value) respectively which are provisionally determined for the light receiver 1 as shown in FIG. 3(a). The H and L signals represent the absence and presence of a film respectively. Accordingly, when the reference voltage level has been increased at Step S2, a determined is made as to whether the output is higher or lower than an increased reference voltage.

When the output of the light receiver 2 is high, an input current to the light emitter 1 is reduced at Step S5 until the output of the light receiver 2 turns to low. Upon the output of the light receiver 2 shifting to low, the input current of the light emitter 1 drops to a level for generating an intensity of illumination which corresponds to the L signal (and is registered).

More specifically, the current driver of the light emitter 1 is set with an increased level of the reference voltage rather than an original level. The increase of current for causing the output voltage of the light receiver 2 to turn to high is applied for eliminating the effect of hysteresis property of the film detector and detecting a point where the output voltage of the light receiver 2 is shifted from high to low on the decay slope.

The reference voltage at the light receiver 2 is then returned to the original level at Step S7. This series of actions give the following verification.

The loading of a film is detected by the film detector as the film is being placed between the light emitter 1 and the light receiver 2. According to the embodiment, the intensity of illumination of the light emitter 1 when blocked is decreased to at least 50% to 60% even if the film carries a lower density.

It is now assumed that the output voltage of the light receiver 2 in response to the illumination of the light emitter 1 is set to correspond to the original reference voltage level (a datum setting value) as in the prior art. In general, the light emitter 1 will deteriorate with time and produce a decreased intensity of illumination after a long-run service of the film detector, e.g. one or two years, while the light receiver 2 remains unchanged in the reference voltage level.

If so, the illumination of the light emitter 1 has to be increased by manual adjustment which is considered a troublesome task. Also, such erratic adjustment as to set the reference voltage to a lower level may result in faulty operation of the photographic printer machine, i.e. a detection signal indicative of the presence of a film is released.

For eliminating such a faulty operation, the present invention allows the light emitter 1 to illuminate so that the light receiver 2 produces a voltage output which is greater by a given increment margin than the reference voltage.

The increment margin is preferably 20% of the original reference voltage. If the increment margin is 50% or greater, the output of the light receiver 2 remains overleveled. Accordingly, since the loss of transmitted light across the film is 50% to 60%, the film detector may correctly generate a detection signal indicative of no presence of the film.

If the margin of the reference voltage is as small as less than 10%, it may easily be affected or offset by the deterioration with time. We have thus determined an eligible margin of 20% through a succession of experiments.

In brief, the current input to the light emitter 1 is increased, while no film is loaded between the light emitter 1 and the light receiver 2 of the film detector, from a low level to a high level sufficient for having the voltage output of the light receiver 2 greater than the reference voltage. As the reference voltage is modified, a difference between the presence and absence of the film is maintained at optimum. Therefore, the detection of any film can be executed at a higher accuracy in response to loading and unloading of the film.

According to the method of the present invention, even if the reference voltage of the film detector is biased due to physical deterioration with time, the film detector performs the foregoing routine procedure before starting its main detecting action. In case that the reference voltage is biased to low, the current input to the light emitter 1 is modified so that the voltage output of the light receiver 2 is 20% higher than the reference voltage. As the result, the difference between the two voltage output levels across the reference voltage remains unchanged while the actual voltage output being changed, ensuring the accuracy of the film detecting action.

Embodiment 2

Figure 4:
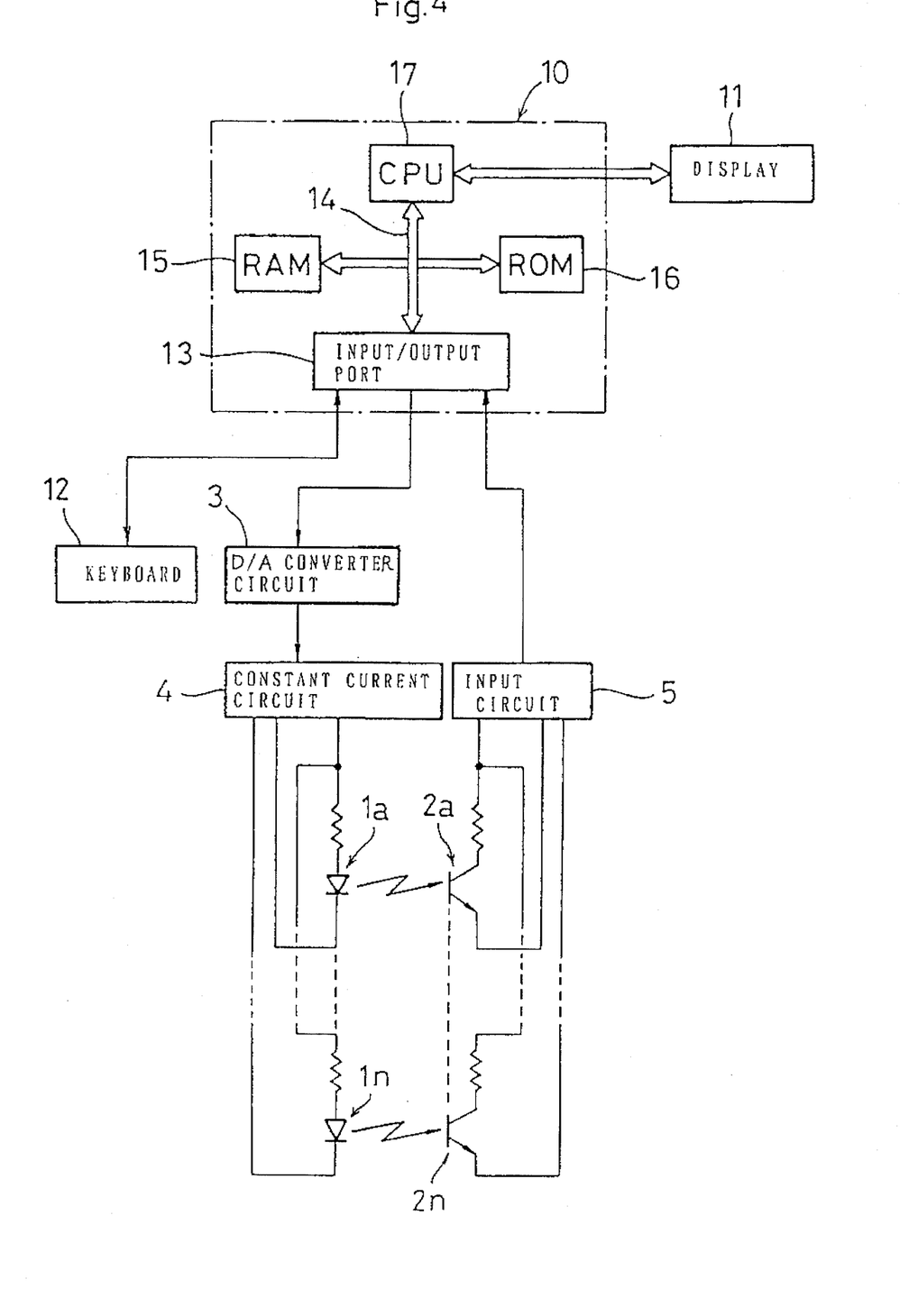
FIG. 4 is a schematic overall block diagram of a control circuit showing the second embodiment of the present invention.

FIG. 4 is a schematic overall block diagram of a control circuit according to a second embodiment of the present invention. As shown, the comparator circuit 6 and the reference voltage generator circuit 7 of the first embodiment are eliminated. Components identical to those of the first embodiment are denoted by like numerals and will not be explained in more detail.

In this embodiment, the above two components are replaced by with a modification of the program in the electronic control circuit 10.

Figure 5:
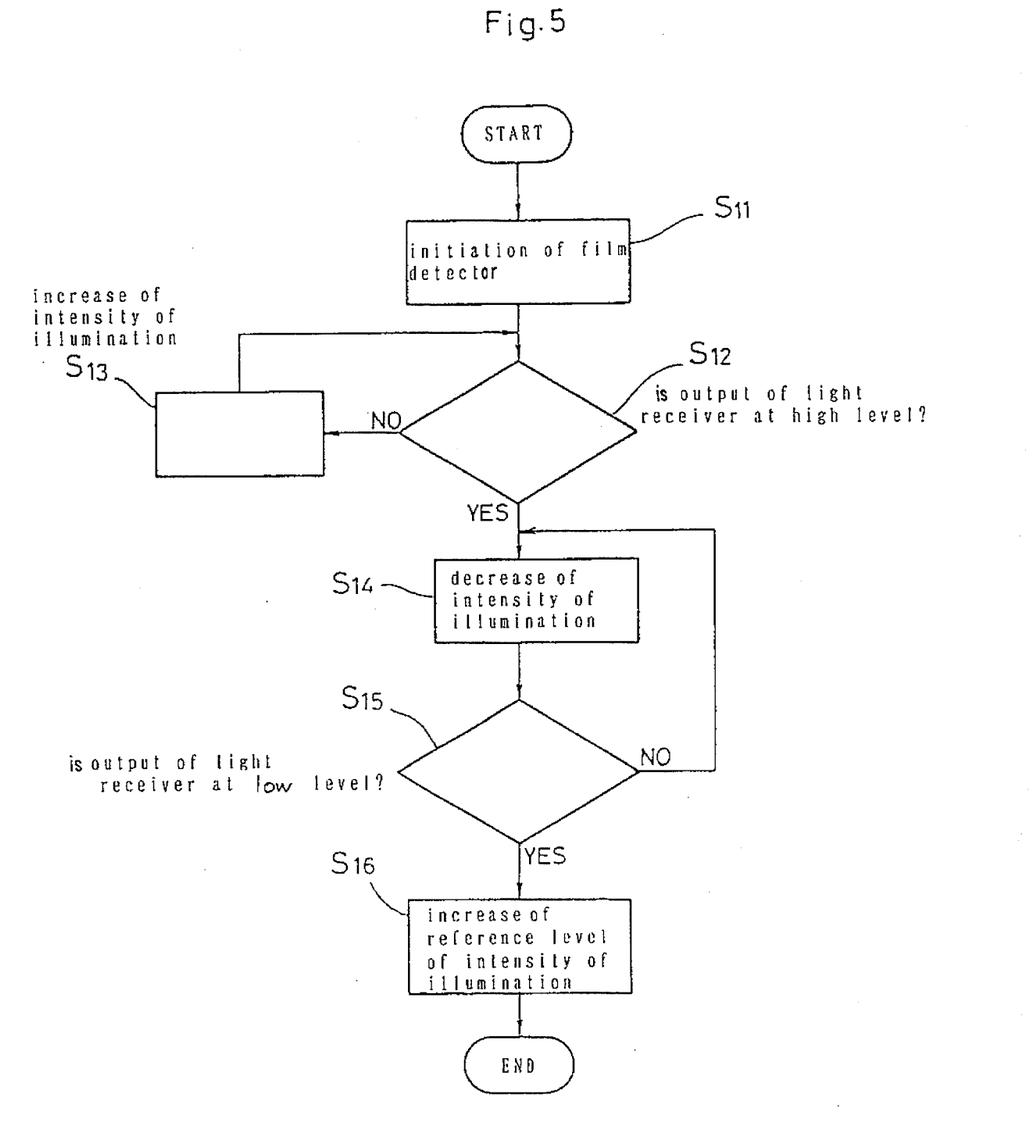
FIG. 5 is a flowchart explaining a method of detecting a film implemented with the control circuit of the second embodiment.

As shown in FIG. 5, a determination is made as to whether or not the output voltage of the light receiver 2 is high at Step S12 similar to Step S3. As the reference voltage is not involved, the output voltage is compared with reference values prepared and stored in the electronic control circuit 10 for judging the level.

The two steps S13 and S14 thus correspond to Steps S4 and S5 of FIG. 2. While Step S15 is equivalent to S6, the routine of FIG. 5 is distinguished by only the fact that the comparison is based on a prepared set of the reference values in a memory.

The current input to the light emitter 1 is increased at Step S16. More specifically, the increase of the current input is calculated by a computer so that it results in a 20% increase of the voltage output. This action is identical to the initial current setting of the first embodiment on the light emitter 1 relative to the reference voltage. Even if the output voltage of the light receiver 2 is biased with time, it will hardly be critical because the current input to the light emitter 1 is modified to offset the bias.

Embodiment 3

Figure 6:
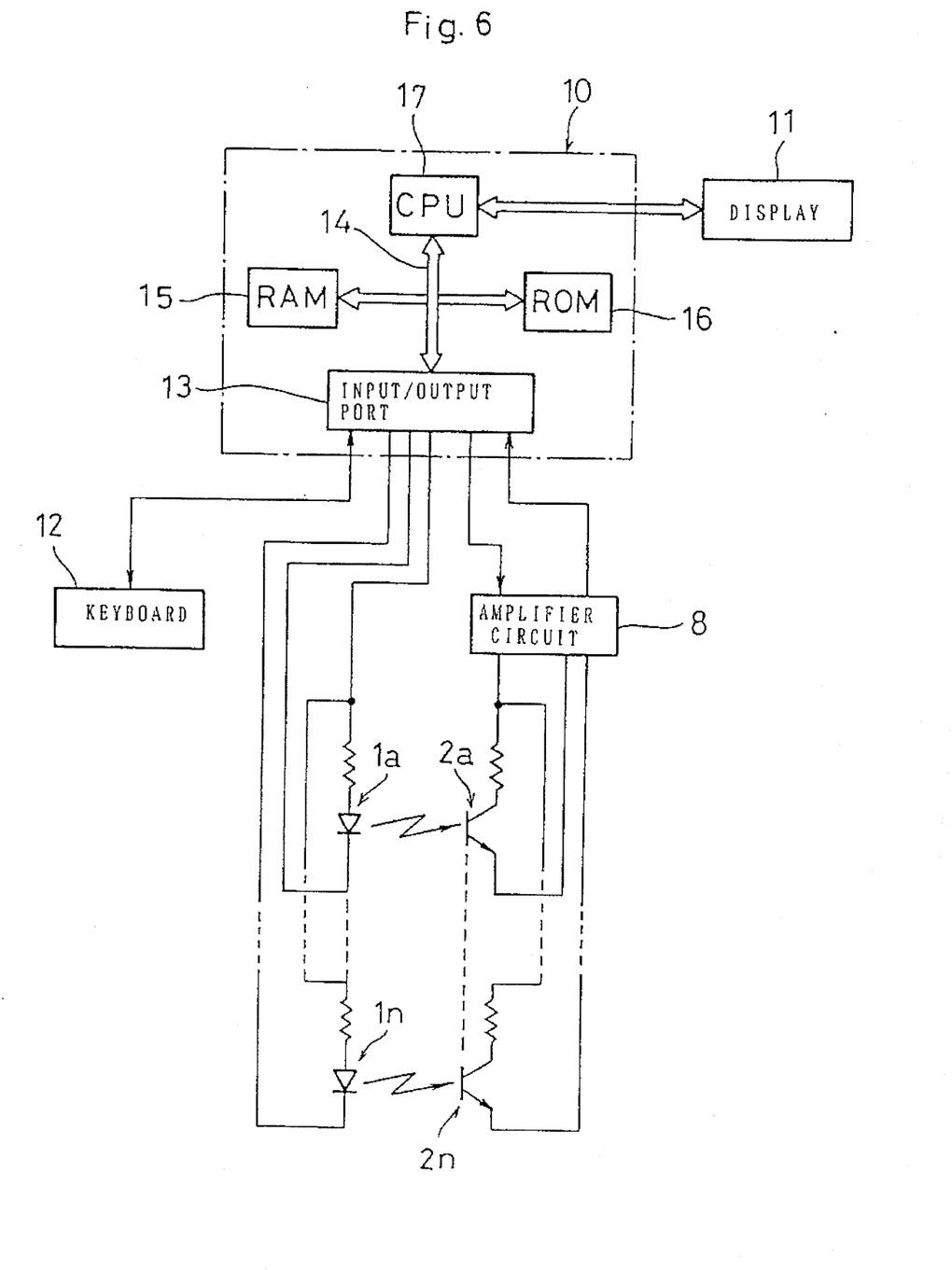
FIG. 6 is a schematic overall block diagram of a control circuit showing the third embodiment of the present invention.

FIG. 6 is a schematic overall block diagram of a control circuit showing a third embodiment of the present invention. As shown, the D/A converter circuit 3, constant current circuit 4, input circuit 5, comparator circuit 6, and reference voltage generator circuit 7 are all eliminated. They are replaced by an amplifier circuit 8 which is coupled between the outputs of the light receivers 2 and the electronic control circuit 10.

The electronic control circuit 10 of this embodiment is substantially composed of a microcomputer operable with digital signals. The light emitters 1 and the light receivers 2 are however driven by analog signals and thus, there a D/A converter and a signal amplifier are provided in the light emitter side and an A/D converter is provided in the light receiver side. Those components are not directly related to the performance of the film detecting method of the present invention and do not appear in the drawing. These the components have been deleted throughout the drawings of the embodiments.

Figure 7:
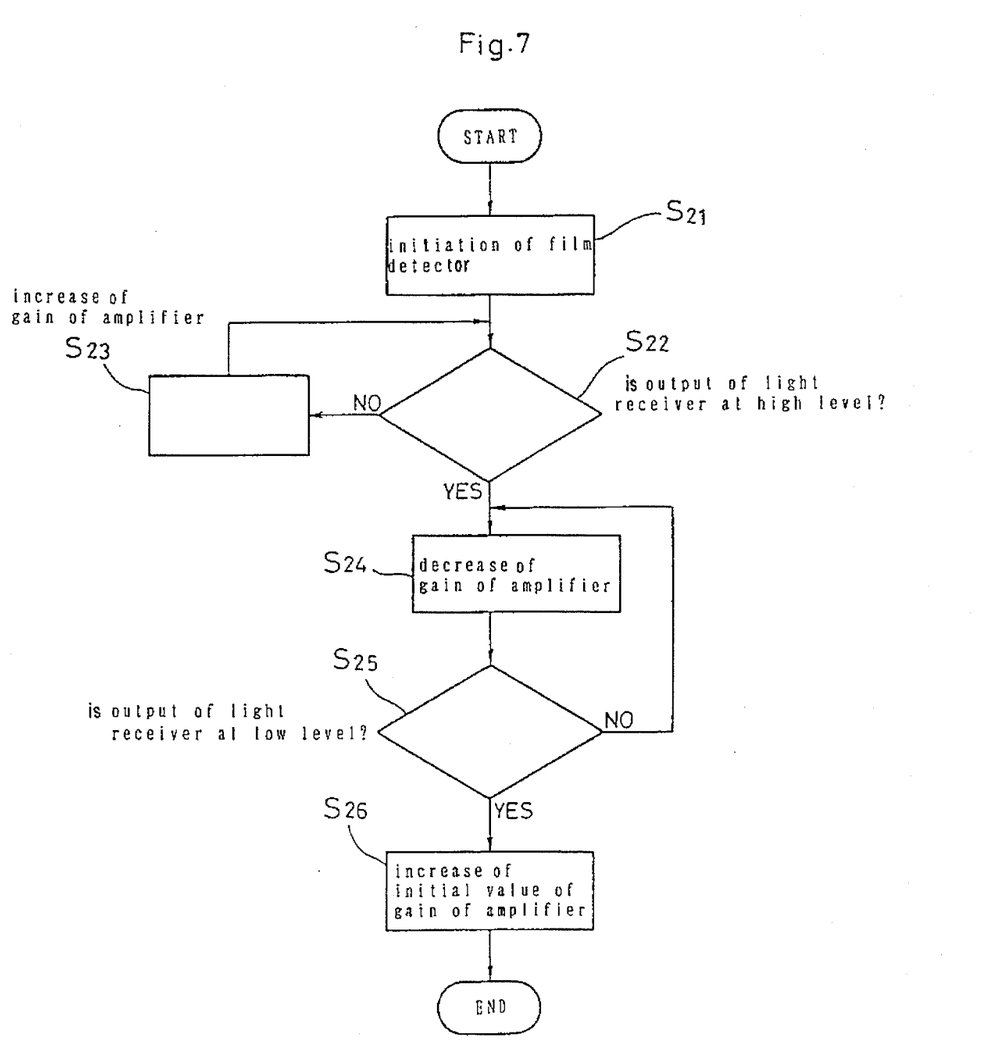
FIG. 7 is a flowchart explaining a method of detecting a film implemented with the control circuit of the third embodiment.

In the third embodiment, the film detecting method is conducted by modifying the gain of the amplifier circuit 8 as illustrated in a flowchart of FIG. 7. Similar to the second embodiment, a determination is made at Step S22 as to whether or not the output voltage of the light receiver 2 supplied through the amplifier circuit 8 is at high level or greater than a corresponding reference value stored in the electronic control circuit 10. If not, the gain of the amplifier 8 is increased until the output voltage becomes a high level (Step S23).

Upon the output voltage reaching the high level, the gain is reduced. When the output voltage is at low level, the gain of the amplifier circuit 8 is observed and registered to the electronic control circuit 10 which in turn determines and records a corresponding reference value. An initial value which is higher by an increment margin than the reference value is then assigned to the gain of the amplifier 8. The increment margin is preferably 20% as in the first embodiment.

As the gain of the amplifier circuit 8 is increased, the output voltage of the light receiver 2 becomes relatively high while the illumination of the light emitter 1 remains unchanged. This is equivalent to an increase of the illumination of the light emitter 1. Accordingly, the action of the film detector will be executed at a higher accuracy as initially modified without using reference a film, similar to the first or second embodiment where the margin is given to the light emitters 1.

Embodiment 4

Figure 8:
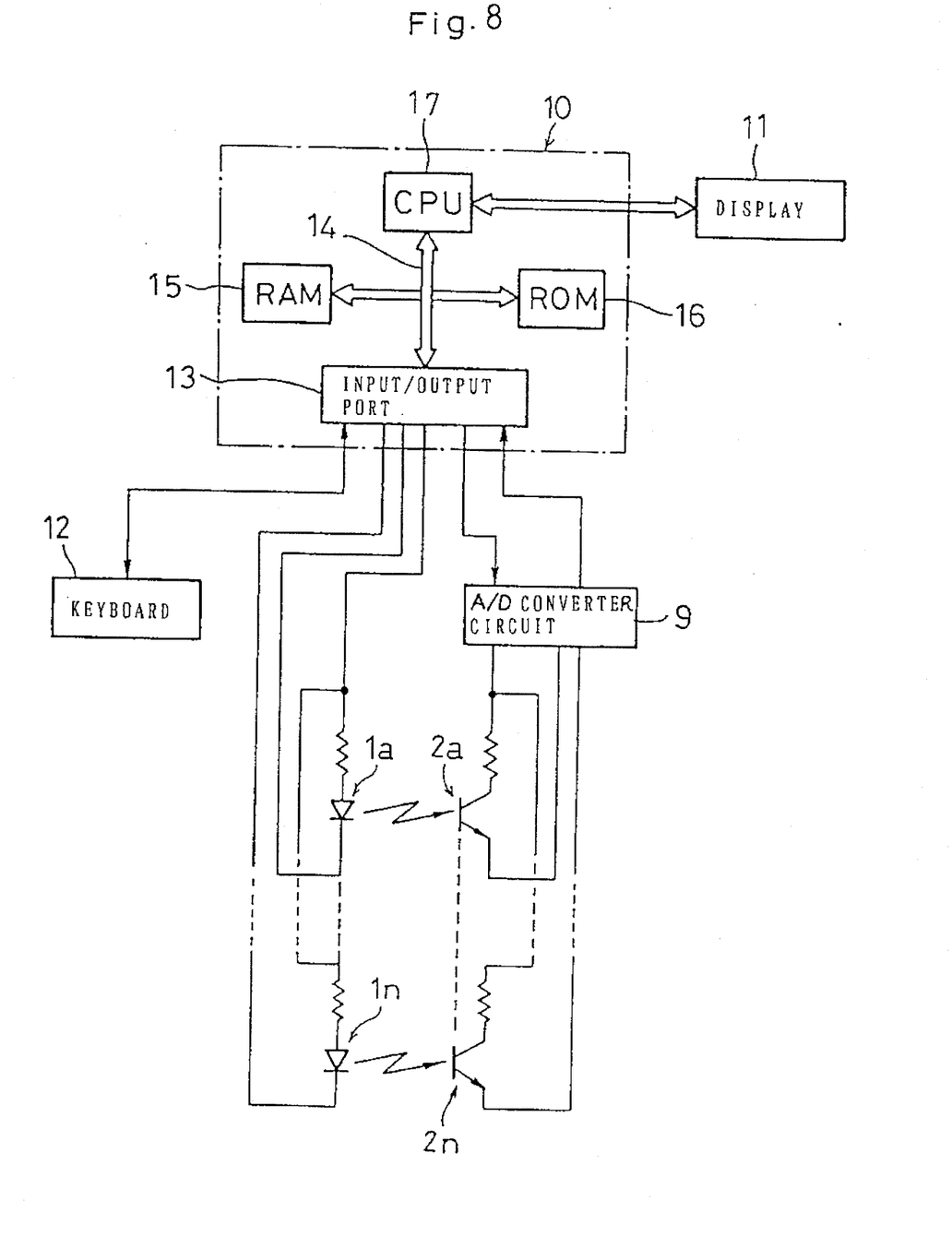
FIG. 8 is a schematic overall block diagram of a control circuit showing the fourth embodiment of the present invention.

FIG. 8 is a schematic block diagram of an overall control circuit showing a fourth embodiment of the present invention. As shown, an A/D converter circuit 9 is coupled to the electronic control circuit 10 which performs a film detecting method of this embodiment.

Figure 9:
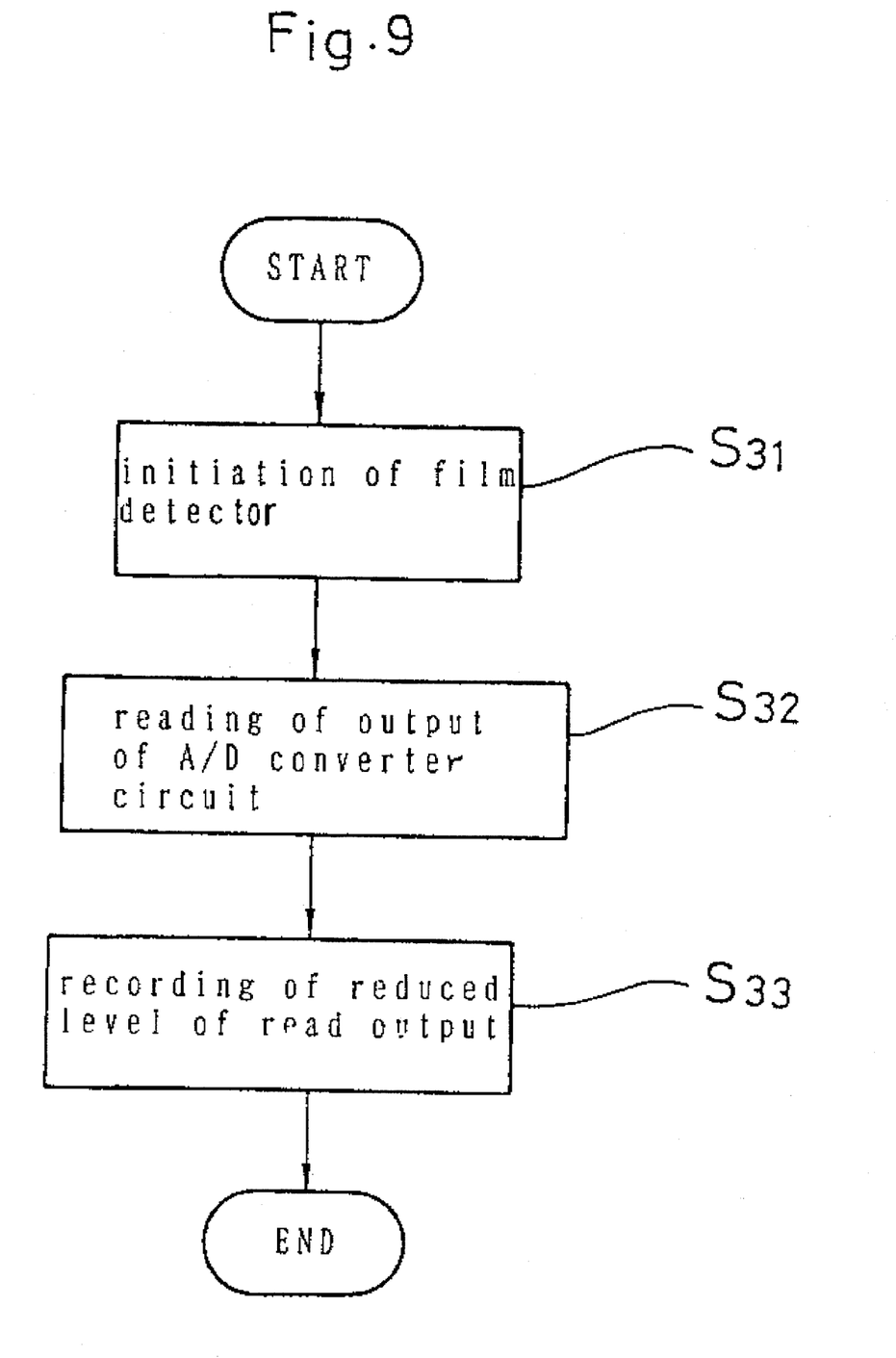
FIG. 9 is a flowchart explaining a method of detecting a film implemented with the control circuit of the fourth embodiment.

At Step S31 of FIG. 9 similar to Step S1 of the first embodiment, a film loaded across the film detector is removed to allow the transmission of light. The step S32 follows for reading an output of the A/D converter circuit 9 as a reference level data. The read output is then reduced to a given level and recorded in a RAM 15 at Step S33. The reduced level is preferably 80% of the original level which is as described in the previous embodiments.

Figure 3B:
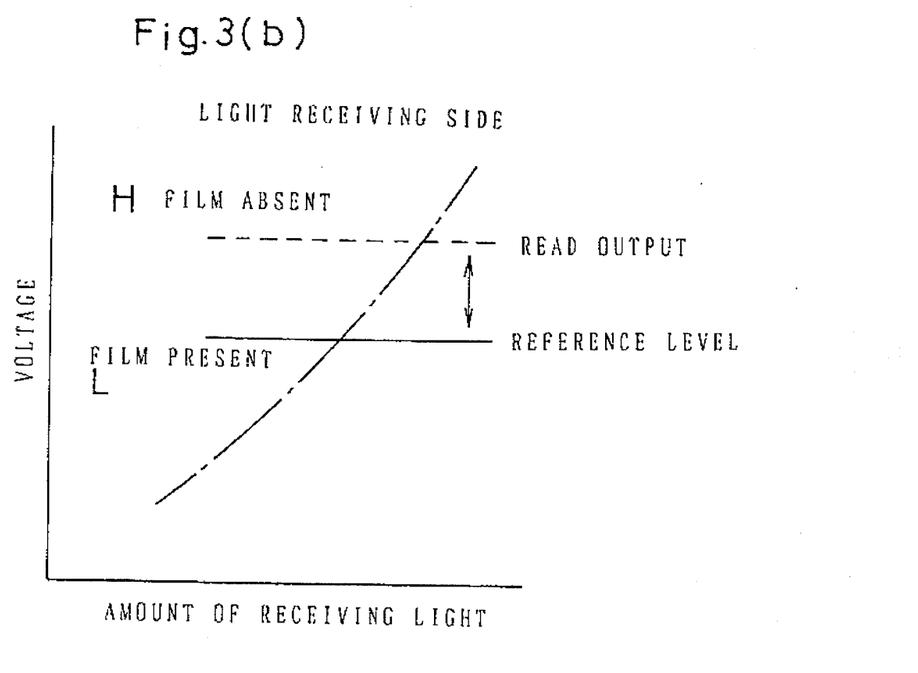

According to the film detecting method, the presence or absence of a film is determined as shown FIG. 3(*b*). When no film is loaded, it is judged that the output of the A/D converter 9 is greater than the reference level, thus to be at high level. If a film is loaded and attenuates the transmission of light, the output is lower than the reference level to be at low level. In other words, the output has a margin of 20% as compared with the reference level.

What is claimed is:

1. A method of detecting a film with an optical detector in a photographic printer machine, the method being provided for detecting the presence of a film with the optical detector being installed at a film detecting location where a light receiver receives an intensity of light from a light emitter, the method comprising the steps of:

determining a setting of the film detector so that outputs of the light receiver are higher than a reference level prepared in a controller for judging the presence of the film; and assigning the setting to the film detector so that the outputs of the light receiver have a sufficient margin as compared with the reference level; wherein the initial setting for detecting the presence of a photographic film is carried out in the absence of using any reference film.

2. A method of detecting a film with an optical detector in a photographic printer machine as claimed in claim 1, wherein the light receiver is provided with an output circuit which contains a reference level modifier, further comprising the steps of:

increasing the reference level by the margin to have a modified reference level;

increasing the illumination of the light emitter until the reference level of the reference level modifier reaches the modified reference level;

shifting the reference level of the reference level modifier back to the original reference level;

wherein the light emitter has a margin of illumination corresponding to the sufficient margin over the reference level.

3. A method of detecting a film with an optical detector in a photographic printer machine as claimed in claim 1, wherein the controller is programmed to increase the illumination of the light emitter so that the margin covers an instantaneous excessive intensity of light over the reference level.

4. A method of detecting a film with an optical detector in a photographic printer machine as claimed in claim 1, wherein the controller is programmed to increase the gain of the light receiver so that the margin covers an instantaneous excessive gain over the reference level.

5. A method of detecting a film with an optical detectors in a photographic printer machine as claimed in claim 1, wherein each output of the light receiver is read in relation to a corresponding intensity of light of the light emitter and reduced to a given level which is then stored and used as the reference level.

* * * * *